United States Patent Office 3,585,040
Patented June 15, 1971

3,585,040
MONO-EPOXY QUINONE HARDENERS
FOR GELATIN
Mary J. Youngquist and John W. Gates, Jr., Rochester, N.Y., assignors to Eastman Kodak Company, Rochester, N.Y.
No Drawing. Filed Oct. 24, 1968, Ser. No. 770,420
Int. Cl. C09d *3/04;* G03c *1/30*
U.S. Cl. 96—111
17 Claims

ABSTRACT OF THE DISCLOSURE

Gelatin is hardened by the incorporation therewith of hardening amounts of a mono-epoxy quinone having the formula:

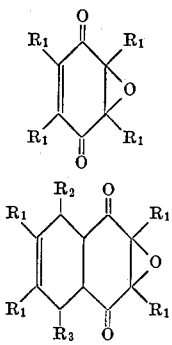

wherein $R_1$ represents hydrogen or alkyl, and $R_2$ and $R_3$ each represent hydrogen or alkyl or together form a methano group.

BACKGROUND OF THE INVENTION

This invention relates to the hardening of gelatin. Gelatin is used to a considerable extent in the photographic industry as a protective colloid for silver halide or in the form of auxiliary layers, such as antistatic layers, overcoatings and the like. In the use of gelatin for photographic purposes, it is often subjected to treatment with aqueous baths which may vary in pH or which may have raised temperatures. There has been a great deal of work done relating to the improvement of the resistance of gelatin to water so that swelling or melting of the gelatin does not occur when contacted with aqueous solutions in processing operations or in hot drying operations. In many instances hardeners used to overcome these effects have exhibited unwanted photographic effects of one kind or another. For instance, hardeners of the aldehyde type sometimes tend to cause an increase in fogging of a gelatino-silver halide emulsion when employed as a hardener therein. The hardeners may also cause loss of speed of an emulsion upon storage. It is desirable that a gelatin hardener will not adversely affect the characteristics of a photographic emulsion in which it is employed.

BRIEF SUMMARY OF THE INVENTION

According to the present invention, new gelatin hardeners are provided which hardeners are eminently suitable for use in connection with light sensitive gelatin silver halide and other gelatin-containing photographic layers. The hardeners according to the invention are mono-epoxy quinones having the formula:

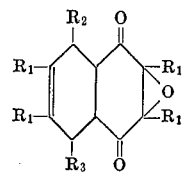

or

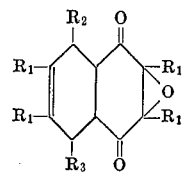

wherein $R_1$ represents hydrogen or alkyl, preferably lower alkyl of up to 5 carbon atoms, and $R_2$ and $R_3$ each represent hydrogen or alkyl, preferably lower alkyl of up to 5 carbon atoms or together form a methano group.

DETAILED DESCRIPTION OF THE INVENTION

We have found that gelatin, when employed as a coating or layer, is resistant to the effects of water even at elevated temperatures with a small proportion of the mentioned mono-epoxy quinone therein. The mono-epoxy quinone exhibits a hardening effect on the gelatin when present in the gelatin composition to any extent. However, the amount in which it will ordinarily be employed will be within the range of 0.5 to 15% by weight, based on the dry weight of the gelatin.

The present invention is carried out by mixing the gelatin while in the form of an aqueous solution thereof with an amount of the mono-epoxy quinone sufficient to harden the gelatin. The hardeners may be prepared by the method of K. Alder et al., Chem. Ber., 93 1896 (1960). The hardeners may be conveniently incorporated in the gelatin composition by dissolving in water or an aqueous solution and adding to the aqueous solution of gelatin in this condition. By using this material as a hardener for gelatin, there is no adverse fogging effect on photographic emulsions using such gelatin as a carrier, the speed of the emulsion is not effected to any appreciable extent and the melting point of the emulsion coating in boiling water is greatly increased.

Examples 1–4

Hardening compounds of the type mentioned below were added to separate portions of a high-speed silver bromoiodide emulsion which had been panchromatically sensitized with cyanine dye. Each emulsion sample was coated on a cellulose acetate film support at a coverage of 459 mg. of silver and 1040 mg. of gelatin per square foot. A sample of each film coating was exposed and processed for five minutes in developer and then fixed, washed, and dried. The percent swell was determined by soaking the dried emulsion for 5 minutes in water at 68° F.

TABLE I

| | Hardener | | Swell, percent |
|---|---|---|---|
| | Type | Amount,[1] wt. percent | |
| Example: | | | |
| 1 | None | | 620 |
| 2 | Control [2] | 0.5 | 400 |
| 3 | A [3] | 3 | 400 |
| 4 | A [3] | 6 | 340 |

[1] The amount of hardener in this and in the following tables, is given as the percent by weight of hardener based on the dry weight of gelatin.
[2] The control in this and in the following examples is mucochloric acid:
[3] p-Benzoquinone epoxide:

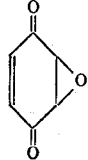

Examples 5–10

The hardening properties of several additional compounds were evaluated by preparing and testing emulsion samples as in Examples 1–4. The results are shown in Table II.

TABLE II

| | Hardener | |
|---|---|---|
| | Type | Amount, wt. percent | Swell, percent |
| Example: | | | |
| 5 | None | | 670 |
| 6 | Control | 0.5 | 410 |
| 7 | B [1] | 3 | 560 |
| 8 | B [1] | 6 | 480 |
| 9 | C [2] | 3 | 520 |
| 10 | D [3] | 6 | 550 |

[1] 4a,5,8,8a-tetrahydro-5,8-methano-1,4-naphthoquinone-2,3-epoxide:

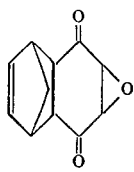

[2] 4a,5,8,8a-tetrahydro-2-methyl-5,8-methano-1,4-naphthoquinone-2,3-epoxide:

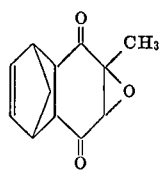

[3] 4a,5,8,8a-tetrahydro-2,3-dimethyl-5,8-methano-1,4-naphthoquinone-2,3-epoxide:

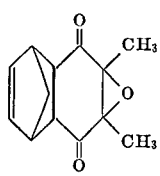

The speed, gamma, and fog values of the emulsions were measured and the properties of the emulsions according to the invention were found to compare favorably with the control as shown in the following table.

TABLE III

| | Fresh test | | |
|---|---|---|---|
| | Relative speed | Gamma | Fog |
| Example: | | | |
| 6 | 100 | 1.41 | 0.23 |
| 7 | 95 | 1.32 | 0.22 |
| 9 | 95 | 1.35 | 0.27 |
| 10 | 87 | 0.95 | 0.07 |

Examples 11–15

The hardening properties of 2,5-dimethyl-1,4-benzoquinone-2,3-epoxide:

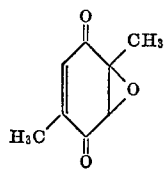

(compound E) were measured by preparing samples as in Examples 1–5 and the results are shown in the following table:

TABLE IV

| | Hardener | | |
|---|---|---|---|
| | Type | Amount, wt. percent | Swell, percent |
| Example: | | | |
| 11 | None | | 700 |
| 12 | Control | 1.2 | 430 |
| 13 | E | 1.0 | 620 |
| 14 | E | 2.0 | 580 |
| 15 | E | 5.0 | 540 |

In addition to the mono-epoxy quinones mentioned in the examples, other compounds according to the foregoing formulas can be utilized according to the present invention such as 2-ethyl-1,4-benzoquinone-2,3-epoxide and other 2-(lower) alkyl derivatives, 2,3-diethyl-1,4-benzoquinone-2,3-epoxide and other 2,3-di(lower) alkyl derivatives, 2,3,5-trimethyl-1,4-benzoquinone-2,3-epoxide, 2,3,5-triethyl-1,4-benzoquinone, and other 2,3,5-tri(lower) alkyl derivatives. Similarly, 4a,5,8,8a-tetrahydro naphthoquinone-2,3-epoxide as well as mono- and poly(lower) alkyl derivatives thereof can be used. In all instances where poly(lower) alkyl derivatives are utilized, the alkyl groups may be the same or different any may include up to 5 carbon atoms.

The hardeners are conveniently utilized in photographic emulsions but may also be utilized in gelatin compositions useful to make shaped articles or coatings such as decorative and protective coatings which may include pigments, dyes, fillers, etc. The emulsions hardened in accordance with the invention can be any of the gelatino-silver halide emulsions which are ordinarily employed for photographic purposes. These emulsions may be of varying halide content and can be chemically sensitized by any of the accepted procedures. The emulsions can be digested with naturally active gelatin or sulfur compounds can be added such as those described in Sheppard U.S. Pat. Nos. 1,574,944 and 1,623,499 or in Sheppard and Brigham U.S. Pat. No. 2,410,689.

The emulsions described can if desired be treated with salts of the noble metals such as ruthenium, rhodium, palladium, iridium and platinum, all of which belong to group VIII of the periodic tables of elements and have an atomic weight greater than 100. Representative compounds are ammonium chloropalladate, potassium chloroplatinate and sodium chloropalladate, which are used for sensitizing in amounts below that which produces any substantial fog inhibition, as described in Smith and Trivelli U.S. Pat. 2,448,060, and as antifoggants in higher amounts, as described in Trivelli and Smith U.S. Pats. 2,566,245 and 2,566,263.

The emulsions described herein, if desired, can be chemically sensitized with gold salts as described in Waller and Dodd U.S. Pat 2,399,083 or stabilized with gold salts as described in Damschroder U.S. Pat. 2,597,856 or Yutzy and Leermakers U.S. Pat. 2,597,915. Suitable compounds are potassium chloroaurite, potassium aurithiocyanate, potassium chloroaurate, auric trichloride and 2-aurosulfobenzothiazole methochloride.

The emulsions described can if desired by sensitized with reducing agents such as stannous salts (Carroll U.S. Pat. 2,487,850), polyamines such as diethylene triamine (Lowe and Jones U.S. Pat. 2,518,698), polyamines such as spermine (Lowe and Allen U.S. Pat. 2,521,925), or bis(B-aminoethyl) sulfide and its water-soluble salts (Lowe and Jones U.S. Pat. 2,521,926).

The described emulsions can be stabilized with the mercury compounds of Allen, Byers, and Murray U.S. Pat. 2,728,664, or Leubner and Murray U.S. Pat. 2,728,665, the tetrazaindenes of Carroll U.S. Pat. 2,716,062, or the quaternary benzothiazolium compounds of Brooker and Staud U.S. Pat. 2,131,038.

The emulsions used may contain speed-increasing compounds of the quaternary ammonium type of Carroll U.S. Pat. 2,271,623 Carroll and Allan U.S. Pat. 2,288,226 or Carroll and Spence U.S. Pat. 2,334,864, or of the polyethylene glycol type described in Carroll and Beach U.S. Pat. 2,708,162.

We claim:
1. A photographic element comprising a layer which contains gelatin and a gelatin-hardening amount of a mono-epoxide hardener for the gelatin, said hardener being selected from those having the formula:

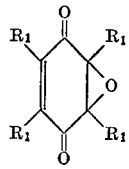

and

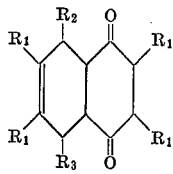

wherein $R_1$ represents a member selected from the group consisting of hydrogen and alkyl and $R_2$ and $R_3$ each represent a member selected from the group consisting of hydrogen and alkyl or taken together represent a methano group.

2. A photographic element according to claim 1 wherein said hardener has the formula:

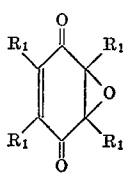

3. A photographic element according to claim 1 wherein said hardener has the formula:

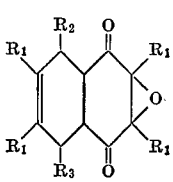

4. A photographic element according to claim 1 wherein said layer is a light sensitive gelatino-silver halide emulsion layer.

5. A photographic element according to claim 4 wherein said hardener is present in an amount of from 0.5 to 15% by weight based on the dry weight of the gelatin.

6. A photographic element according to claim 1 wherein said hardener comprises p-benzoquinone epoxide.

7. A photographic element according to claim 1 wherein said hardener comprises 4ª,5,8,8ª-tetrahydro-5,8-methano-1,4-naphthoquinone-2,3-epoxide.

8. A photographic element according to claim 1 wherein said hardener comprises 4ª,5,8,8ª-tetrahydro-2-methyl-5,8-methano-1,4-naphthoquinone-2,3-epoxide.

9. A photographic element according to claim 1 wherein said hardener comprises 4ª,5,8,8ª-tetrahydro-2,3-dimethyl-5,8-methano-1,4-naphthoquinone-2,3-epoxide.

10. A photographic element according to claim 1 wherein said hardener comprises 2,5-dimethyl-1,4-benzoquinone-2,3-epoxide.

11. A photographic element according to claim 1 wherein said hardener comprises 2,3,5-trimethyl-1,4-benzoquinone-2,3-epoxide.

12. A composition of matter comprising gelatin containing a gelatin-hardening amount of a mono-epoxide having the formula:

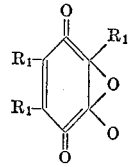

wherein $R_1$ represents a member selected from the group consisting of hydrogen and alkyl.

13. A composition according to claim 12 wherein $R_1$ represents hydrogen or lower alkyl of 1 to 5 carbon atoms.

14. A composition of matter comprising gelatin containing a gelatin-hardening amount of mono-epoxide having the formula:

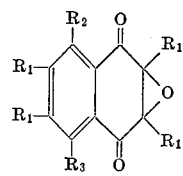

wherein $R_1$ represents a member selected from the group consisting of hydrogen and alkyl and $R_2$ and $R_3$ each represent a member selected from the group consisting of hydrogen and alkyl or taken together represent a methano group.

15. A composition according to claim 14 wherein $R_1$ represents hydrogen or lower alkyl of 1 to 5 carbon atoms and $R_2$ and $R_3$ each represent hydrogen or lower alkyl of 1 to 5 carbon atoms or taken together represent a methano group.

16. A composition of matter according to claim 12 wherein said hardener is present in an amount of from 0.5 to 15 percent by weight based on the dry weight of the gelatin.

17. A composition of matter according to claim 14 wherein said hardener is present in an amount of from 0.5 to 15 percent by weight based on the dry weight of the gelatin.

References Cited
UNITED STATES PATENTS

| | | | |
|---|---|---|---|
| 3,215,708 | 11/1965 | Fan et al. | 260—348 |
| 3,400,200 | 9/1968 | Fan et al. | 260—348 |
| 3,225,070 | 12/1965 | Fan | 260—348 |
| 3,280,152 | 10/1966 | Tinsley et al. | 260—348 |
| 2,312,535 | 5/1943 | Fieser | 260—348 |
| 2,589,686 | 3/1952 | Fawaz | 260—348 |

WILLIAM D. MARTIN, Primary Examiner

M. SOFOCLEOUS, Assistant Examiner

U.S. Cl. X.R.

106—125; 260—117, 348

PO-1050
(5/69)

UNITED STATES PATENT OFFICE
CERTIFICATE OF CORRECTION

Patent No. 3,585,040                Dated June 15, 1971

Inventor(s) Mary J. Youngquist and John W. Gates, Jr.

It is certified that error appears in the above-identified patent and that said Letters Patent are hereby corrected as shown below:

Column 3, line 74, "$H_3C$" should read ---$HC_3$---.

Column 4, line 46, "tables" should read ---table---.

Column 6, line 18, "O" should read ---$R_1$---.

Signed and sealed this 20th day of June 1972.

(SEAL)
Attest:

EDWARD M. FLETCHER, JR.           ROBERT GOTTSCHALK
Attesting Officer                  Commissioner of Patents